United States Patent [19]

Hara

[11] Patent Number: 4,583,067
[45] Date of Patent: Apr. 15, 1986

[54] ELECTROMAGNETIC SOLENOID DEVICE

[75] Inventor: Tadayuki Hara, Himeji, Japan

[73] Assignee: Mitsubishi Denki Kabushiki Kaisha, Tokyo, Japan

[21] Appl. No.: 662,070

[22] Filed: Oct. 18, 1984

[30] Foreign Application Priority Data

Oct. 20, 1983 [JP] Japan .................................. 58-197782

[51] Int. Cl.[4] .............................................. H01F 7/08
[52] U.S. Cl. ..................... 335/261; 335/262; 335/279
[58] Field of Search ............... 335/255, 258, 260, 261, 335/262, 279

[56] References Cited

U.S. PATENT DOCUMENTS

| 1,236,177 | 8/1917 | Jacobs | 335/261 X |
| 2,987,655 | 6/1961 | McCurdy | 335/261 X |
| 4,282,501 | 8/1981 | Myers | 335/261 X |

Primary Examiner—George Harris
Attorney, Agent, or Firm—Oblon, Fisher, Spivak, McClelland & Maier

[57] ABSTRACT

An electromagnetic solenoid device comprises a plunger loosely fitted in a coil so as to be slidable in the axial direction by the actuation of the coil, wherein the plunger is placed in a through hole of the coil at the side of an end plate which is provided at an end of a yoke and the plunger has an inclined portion for increasing magnetic resistance between an end of the plunger and the end plate.

7 Claims, 4 Drawing Figures

ELECTROMAGNETIC SOLENOID DEVICE

BACKGROUND OF THE INVENTION

1. Field of the Invention

The present invention relates to an electromagnetic solenoid device. More particulary, it relates to an electromagnetic solenoid device used for an electromagnetic valve for power steering control of an automobile.

2. Discussion of the Background

As a device of this kind, there is known an invention disclosed in Japanese Utility Model Unexamined Publication No. 35009/1982. The known device will be described with reference to FIG. 1. In FIG. 1, a reference numeral 1 designates an electromagnetic solenoid device, a numeral 2 designates a solenoid coil, a numeral 3 designates a plunger, a numeral 4 designates a push rod, a numeral 5 designates a control valve for an oil pressure flow path, a numeral 6 designates a spool, a numeral 7 designates a spring bearing, a numeral 8 designates a spring, and characters T, A and P respectively designate oil pressure flow paths.

The operation of the conventional electromagnetic solenoid device will be described.

When the solenoid coil 2 is actuated by feeding current from an external d.c. power source device, the plunger 3 is moved in the direction of the arrow mark to push the push rod 4. A pressing force of the push rod is transmitted to a spool 6 and the spool 6 is caused to slide on the left hand in FIG. 1, compressing the spring 8. During the sliding movement of the spool 6, the oil pressure flow paths T, A and P are changed.

Since the conventional electromagnetic solenoid device is constructed as described above, an attractive force acting on the plunger (a movable iron core) is changed exponentially due to movement (sliding movement in its axial direction) of the plunger. Particularly, when oil pressure flow paths are to be controlled, reliable control can not be obtained.

SUMMARY OF THE INVENTION

It is an object of the present invention to eliminate the disadvantage of the conventional device and to provide an electromagnetic solenoid device in which magnetic resistance in a movable iron core is gradually increased as it is moved in the axial direction.

It is another object of the present invention to provide an electromagnetic solenoid device having a compact structure.

According to the present invention, there is provided an electromagnetic solenoid device comprising a plunger loosely fitted in a coil so as to be slidable in the axial direction by the actuation of the coil, characterized in that the plunger is placed in a through hole of the coil at the side of an end plate which is provided at an end of a yoke, the plunger having an inclined portion for increasing magnetic resistance between an end of said plunger and said end plate.

BRIEF DESCRIPTION OF THE DRAWINGS

The foregoing objects, other objects as well as the specific construction of the electromagnetic solenoid device will become more apparent and understandable from the following detailed description thereof, when read in conjunction with the accompanying drawing.

In the drawing.

DESCRIPTION OF THE PREFERRED EMBODIMENTS

A preferred embodiment of the electromagnetic solenoid device will be described in more detail with reference to accompanying drawing.

Figure 2:
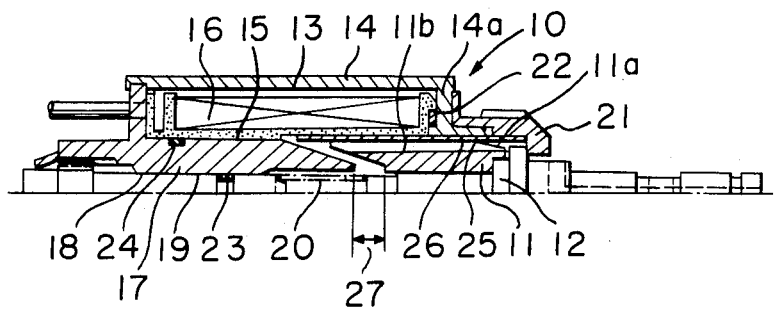
FIG. 2 is a cross-sectional view of the upper half portion with respect to the axial center of an embodiment of the electromagnetic solenoid device according to the present invention.

FIG. 2 shows an embodiment of the electromagnetic solenoid device 10 according to the present invention. The electromagnetic solenoid device 10 includes a cylindrical movable iron core 11 as a plunger and a spool rod 12 of a non-magnetic substance is fitted in the central bore of the movable iron core 11 at the side of a control valve body (not shown). The movable iron core 11 has an end part 11a finished in a tapered form i.e. an inclined portion lowered toward the valve body so that resistance in a magnetic circuit gradually increases as the movable iron core moves in the axial direction.

Further, a groove 11b is formed in the outer circumferential surface of the movable iron core 11. The groove 11b acts to prevent pumping effect produced in a space filled with working oil when the movable iron core 11 moves in the axial direction toward a stationary iron core. The movable iron core 11 is put in a yoke 14 made of soft steel and a coil bobbin 13 is held in the inner circumferential surface of the yoke. The coil bobbin 13 is constituted by a bobbin 15 made of a resinous material and a coil 16 wound on the bobbin.

Figure 1:
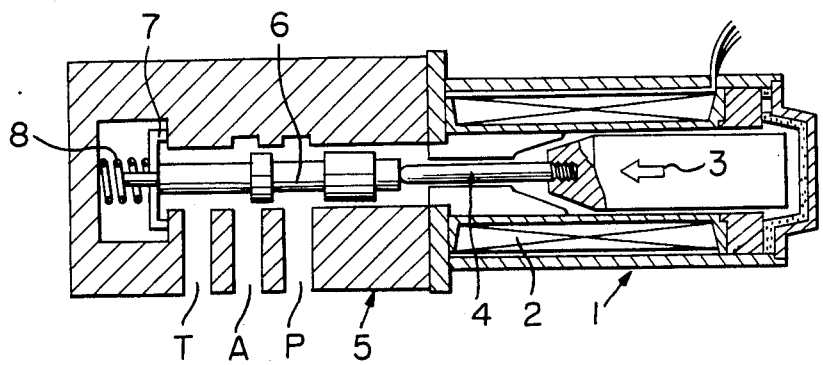
FIG. 1 is a cross-sectional view of a conventional electromagnetic solenoid device connected to a control valve for an oil pressure flow path.

At one end of the yoke 14, a stationary iron core 17 is fitted. A part of the stationary iron core 17 extends into the coil bobbin 13 and a screw rod 19 is screw-engaged with the central bore 18 of the stationary iron core 17. A coil spring 20 for compression is provided at one end of the stationary iron core 17 opposing the movable iron core 11 whereby the movable iron core (including the spool rod 12) is always pushed to a returning position. At the other end of the yoke 14, attached is a boss 21 having an axial hole through which the spool rod 12 extends. The boss 21 is screw-engaged with the valve body 5 as shown in FIG. 1. Reference numerals 22, 23 and 24 designate O-rings for prevention of leakage of the working oil which isolate between the coil bobbin 13 and a space in which the movable iron core 11 slidingly moves. A sleeve 26 made of a non-magnetic substance is fitted in the inner circumferential surface of a through hole 25 which passes through both the centers of an end plate 14a of the yoke 14 and the boss 21, the length of the sleeve covering a range that the movable iron core is slidingly moved. The movable iron core 11 is loosely fitted at the inner surface side of the sleeve 26. The sleeve serves not only to snugly receive therein the plunger, but also to make sliding movement of the plunger smooth owing to the finely finished inner surface. In other words, sliding resistance, linearity and mechanical hysteresis with respect to the plunger are reduced. Further, the sleeve 26 of non-magnetic substance allows reduction in clearance between the inner diameter of the sleeve 26 and the outer diameter of the plunger 11 to about 20 $\mu$m–40 $\mu$m in the radial direction as well as formation of a magnetic path (in the radial direction) by a uniform air gap, on account of which biting of the plunger due to an unbalanced magnetic attractive force in the radial direction in case of movement of the plunger in the axial direction at the time of current feeding to the coil can be prevented.

Figure 3B:
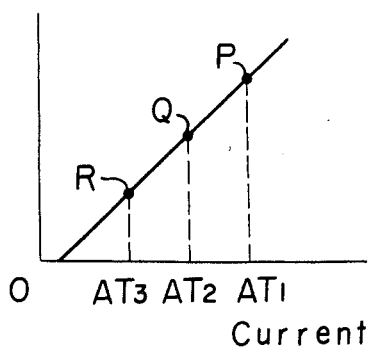
FIGS. 3a and 3b are respectively graphs showing characteristic of operation of the device shown in FIG. 2.
Figure 3A:
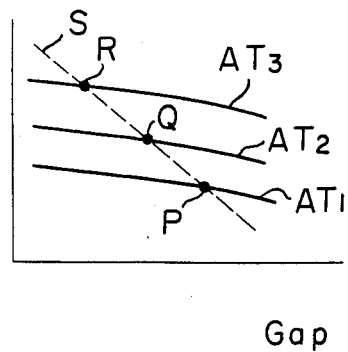

The operation of the electromagnetic solenoid device 10 examplified as above-mentioned will be described with reference to FIGS. 3a and 3b.

When the coil 16 is energized by current concution by an external d.c. power source device, a magnetic circuit including yoke 14—end plate 14a—movable iron core 11 —air gap 27—stationary iron core 17—yoke 14 is formed, on account of which the movable iron core 11 is attracted to the stationary iron core 17 on the left side in FIG. 2 against the spring action of the coil spring 20. Along with the movable iron core, the spool rod 12 is caused to slide in the axial direction whereby the oil pressure, valve is cdhtrolled. An attractive force acting on the movable iron core 11 is shown in the graph of FIG. 3(a). In the graph, the ordinate represents attractive force and the abscissa represents length of an air gap 27 (gap length) formed between the movable iron core 11 and stationary iron core 17. In the graph, curves $AT_1$, $AT_2$ and $AT_3$ respesent variations of attractive force which moves the movable iron core 11 in the axial direction at three levels of magnetization of the coil 16. When the air gap becomes small, namely, the movable iron core 11 moves to the left side in FIG. 2, the air gap formed between the tapered portion of the rear end part 11a and the end plate 14a gradually increases to thereby increase magnetic resistance and accordingly, characteristic of the attractive force becomes substantially flat.

A graph of a broken line S represents a pushing force of the coil spring 20 acting on the movable iron core 11 and points of intersection P, Q and R of the graph S to the graphs $AT_1$, $AT_2$ and $AT_3$ represent balanced condition in stress, at which positions the movable iron core 11 stops. The characteristic as described above is shown in FIG. 3b with the co-ordinates changed. In the graph of FIG. 3b, the ordinate represents air gap and the abscissa represents magnitude of magnetization (exciting force) of the coil 16. The graph shows that a coil current is substantially in linearly proportional to the quantity of movement (gap) of the movable iron core 11. Accordingly, the displacement of the spool rod 12 in linearly proportional to current flowing in the coil 16 (magnitude of magnetization) can be obtained whereby the degree of opening the oil pressure valve as shown in FIG. 1 can be linearly controlled.

As described above, the electromagnetic solenoid device of the present invention provides a linearly proportional control characteristic to impart excellent controlability by forming a tapered portion in the end part of a movable iron core so that resistance in a magnetic circuit increases depending on the movement in the axial direction of the movable iron core.

I claim:

1. An electromagnetic solenoid device comprising a plunger loosely fitted in a coil so as to be slidable in the axial direction by the actuation of said coil, characterized in that said plunger is placed in a through hole of said coil at the side of an end plate which is provided at an end of a yoke, said plunger having an inclined portion for increasing magnetic resistance between an end of said plunger and said end plate, and wherein a sleeve made of a non-magnetic material is fitted in said through hole and extends over a range in which said plunger is slidingly moved.

2. The electromagnetic solenoid device according to claim 1, wherein said inclined portion is lowered toward a control valve body.

3. The electromagnetic solenoid device according to claim 1, wherein a stationary iron core is fixed inside said coil held by said yoke; said plunger is arranged in the same axial line as said stationary iron core and a coil spring is interposed between said stationary iron core and said plunger to form an air gap.

4. The electromagnetic solenoid device according to claim 1, wherein a spool rod is connected to an end of said plunger and project into a control valve body.

5. The device of claim 1 wherein said sleeve has a smooth, finished inner surface and closely surrounds said plunger whereby said plunger is snugly received in said sleeve.

6. The device of claim 5 wherein said plunger has a groove in a surface thereof facing said sleeve, said groove extending between ends of said plunger in said axial direction.

7. The device of claim 6 wherein said through hole is filled with oil.

* * * * *